(12) United States Patent
Davis

(10) Patent No.: US 10,654,523 B2
(45) Date of Patent: May 19, 2020

(54) VEHICLE ATTACHMENT

(71) Applicant: Larry Davis, Natchez, MS (US)

(72) Inventor: Larry Davis, Natchez, MS (US)

( * ) Notice: Subject to any disclaimer, the term of this patent is extended or adjusted under 35 U.S.C. 154(b) by 0 days.

(21) Appl. No.: 15/530,945

(22) Filed: Mar. 28, 2017

(65) Prior Publication Data

US 2018/0334190 A1 Nov. 22, 2018

(51) Int. Cl.
| | |
|---|---|
| *B62D 61/00* | (2006.01) |
| *B62D 21/02* | (2006.01) |
| *B62D 61/06* | (2006.01) |
| *B62D 65/00* | (2006.01) |

(52) U.S. Cl.
CPC ........... *B62D 21/02* (2013.01); *B62D 61/065* (2013.01); *B62D 65/00* (2013.01)

(58) Field of Classification Search
CPC ..... B62D 61/065; B62D 65/04; B62D 47/003
USPC ................................................. 180/209, 210
See application file for complete search history.

(56) References Cited

U.S. PATENT DOCUMENTS

| | | | | |
|---|---|---|---|---|
| 3,802,716 A | * | 4/1974 | Wiers ..................... | B62D 21/14 280/407.1 |
| 4,099,313 A | * | 7/1978 | Phillips ................. | B62D 47/003 29/401.1 |
| 5,236,060 A | * | 8/1993 | Huber .................. | B62D 61/065 180/210 |
| 5,401,056 A | * | 3/1995 | Eastman .................. | B60G 3/20 280/785 |
| 6,131,284 A | * | 10/2000 | Basler .................. | B62D 25/082 29/458 |
| 6,493,920 B1 | * | 12/2002 | Hill ........................ | B62D 25/06 29/430 |
| 7,581,610 B2 | * | 9/2009 | Ward .................... | B62D 61/065 180/209 |
| 7,726,675 B2 | * | 6/2010 | Ben-Ari .................. | B60P 3/423 280/149.2 |
| 7,922,238 B2 | * | 4/2011 | Ische .................... | B62D 33/077 296/193.04 |
| 8,727,426 B2 | * | 5/2014 | Vitale .................... | B62D 21/14 296/193.04 |

* cited by examiner

*Primary Examiner* — Joshua T Kennedy

(57) ABSTRACT

A method for attaching a rear frame suspension module to an existing vehicle that will operate on the existing automotive engine, heating, and cooling system. The rear frame suspension module supports passengers sitting straddled in a front to back position to give an existing vehicle a motorcycle-like appearance. The rear suspension module can be attached and removed from an existing automobile front frame suspension module. The resulting wider front structure of the vehicle makes for safer riding compared to a two wheel motorcycle. Vehicle maintenance can be done at most automotive repair shops.

1 Claim, 41 Drawing Sheets

VEHICLE ATTACHMENT

BACKGROUND OF THE INVENTION

Figure 1:
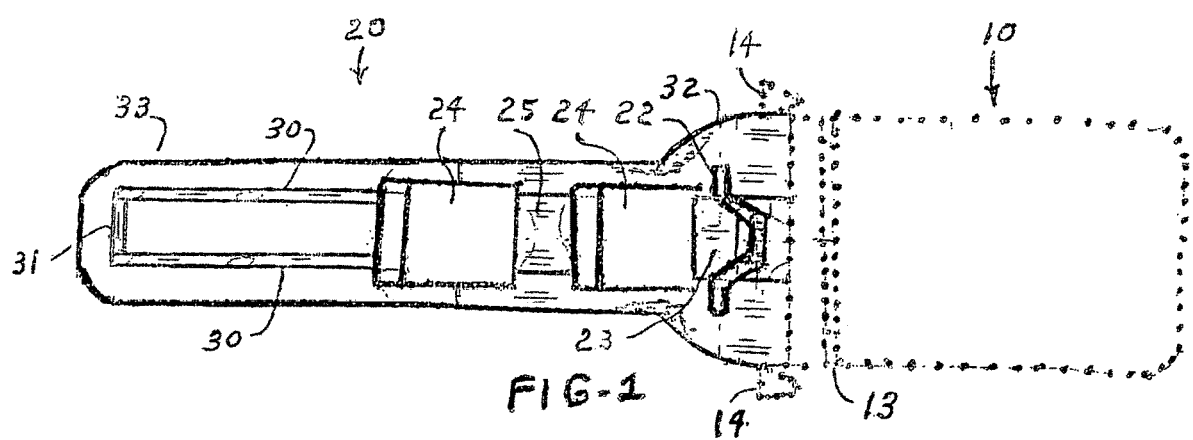

A conventional automobile is easy to drive compared to a two-wheel conventional motorcycle and has climate control features for hot and cold weather compared to a two-wheel motorcycle with no climate control feature system. A conventional motorcycle also has disadvantages relative to an automobile when it is used for basic transportation rather than for sport. For example, the motorcycle is unstable, whereas a conventional four-wheel passenger automobile has always had a wide base for stability. While traveling at a very low speed, the operator must place one foot on the roadway and exert physical effort to prevent a sideward toppling of the motorcycle. This problem is eliminated when the rear frame suspension module disclosed herein is installed to a front suspension of an existing automobile having a wide base.

The vehicle will have a combined motorcycle and automobile appearance and have all of the advantages of a conventional automobile as mentioned above and will be supported by one wheel or two wheels. The rear frame suspension module is attached at the frame rails with welds or bolts to the existing front frame rails suspension module. The operator and passenger(s) will sit in a straddled position.

BRIEF SUMMARY OF THE INVENTION

The invention includes an existing vehicle comprising a front module which contains the engine, drive train for propelling the vehicle, the heating and cooling system, steering system, and front electrical system. The existing vehicle passenger compartment has been transformed. The horizontal front seat and back seat of the existing vehicle have been moved. The top and side doors of the vehicle have been removed. Existing vehicle rear frame rails have been removed. A rear suspension module has been installed which has a narrow passenger and cargo compartment. The seats (1, 2, or more) are aligned along a longitudinal center line of the vehicle. The passenger can sit in a straddled position. The steering assembly is moved to a longitudinal center line of the vehicle. The vehicle rear frame suspension module is supported by one wheel or two wheels. The rear frame suspension model is attached at the frame rail with welds or bolts to the existing front frame rail suspension module, creating the whole innovative vehicle.

BRIEF DESCRIPTION OF SEVERAL VIEWS OF THE DRAWING(S)

FIG. 1. A top view of rear frame suspension module attached to an existing vehicle front frame suspension module.

Figure 2:
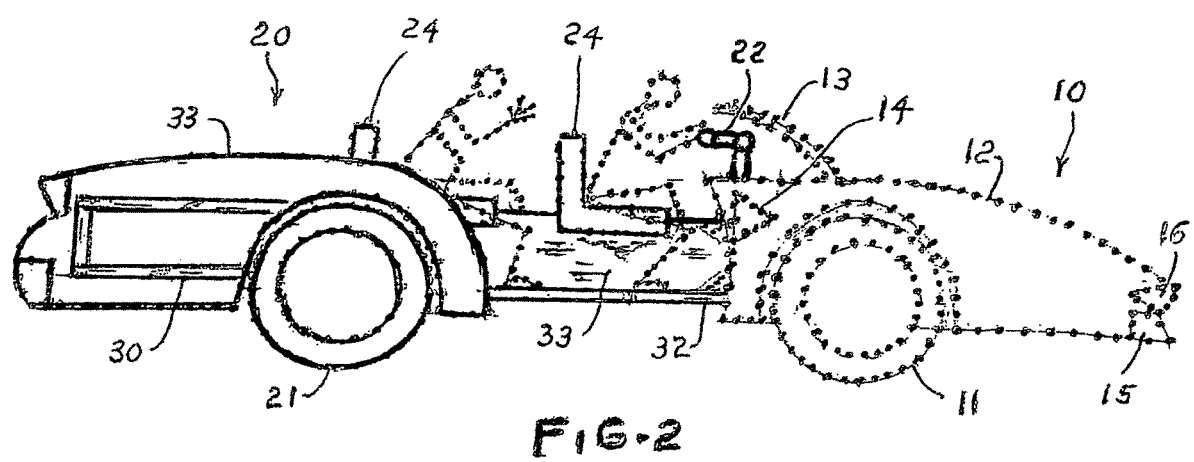

FIG. 2. A side elevation view of the rear frame suspension module attached to an existing vehicle front frame suspension module.

Figure 3:
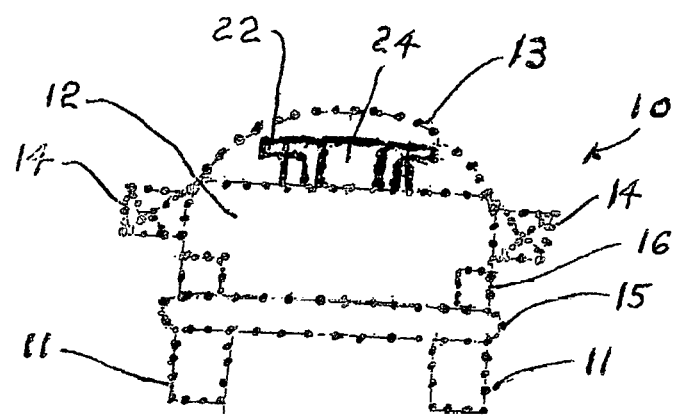

FIG. 3. A front view of an existing vehicle front frame suspension module.

Figure 4:
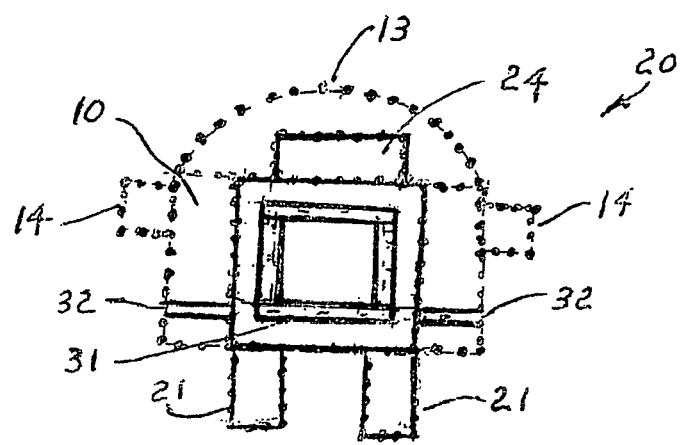

FIG. 4. A rear view of the rear frame suspension module.

Figure 5:
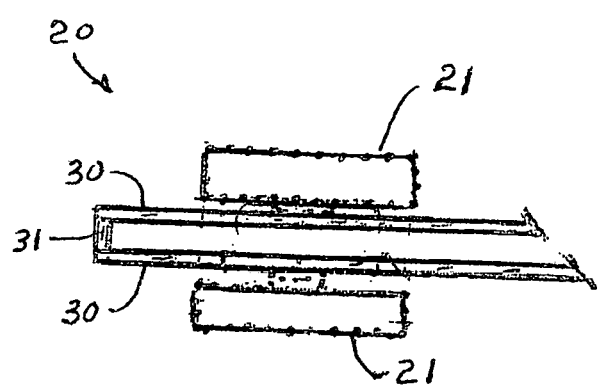

FIG. 5. A rear bottom view showing two wheels supporting the rear frame suspension module.

Figure 6:
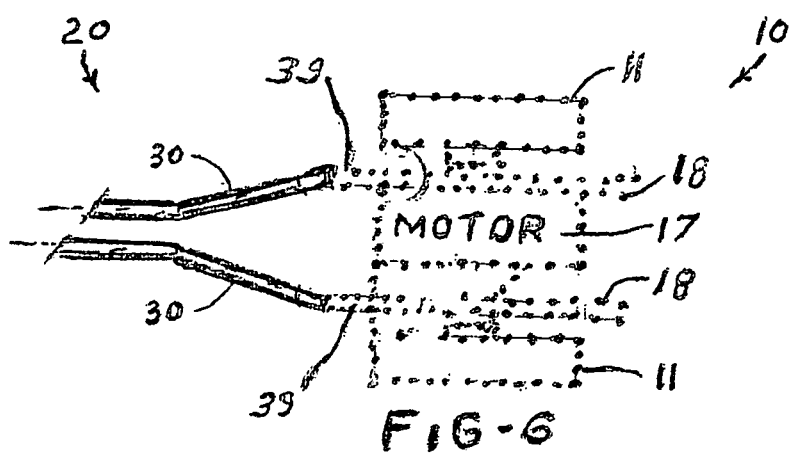

FIG. 6. A front bottom view of an existing vehicle front frame suspension module attached to the rear frame suspension module.

Figure 7:
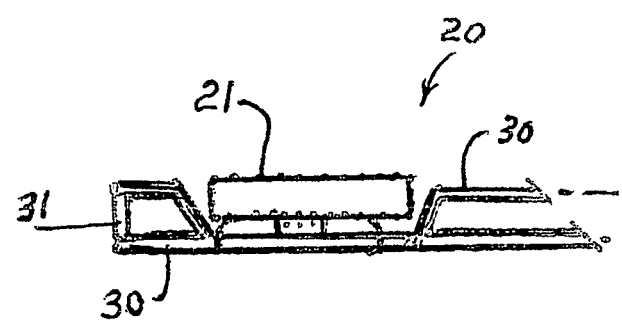

FIG. 7. A rear bottom view showing one wheel mounted on the vehicle rear frame suspension module.

Figure 8:
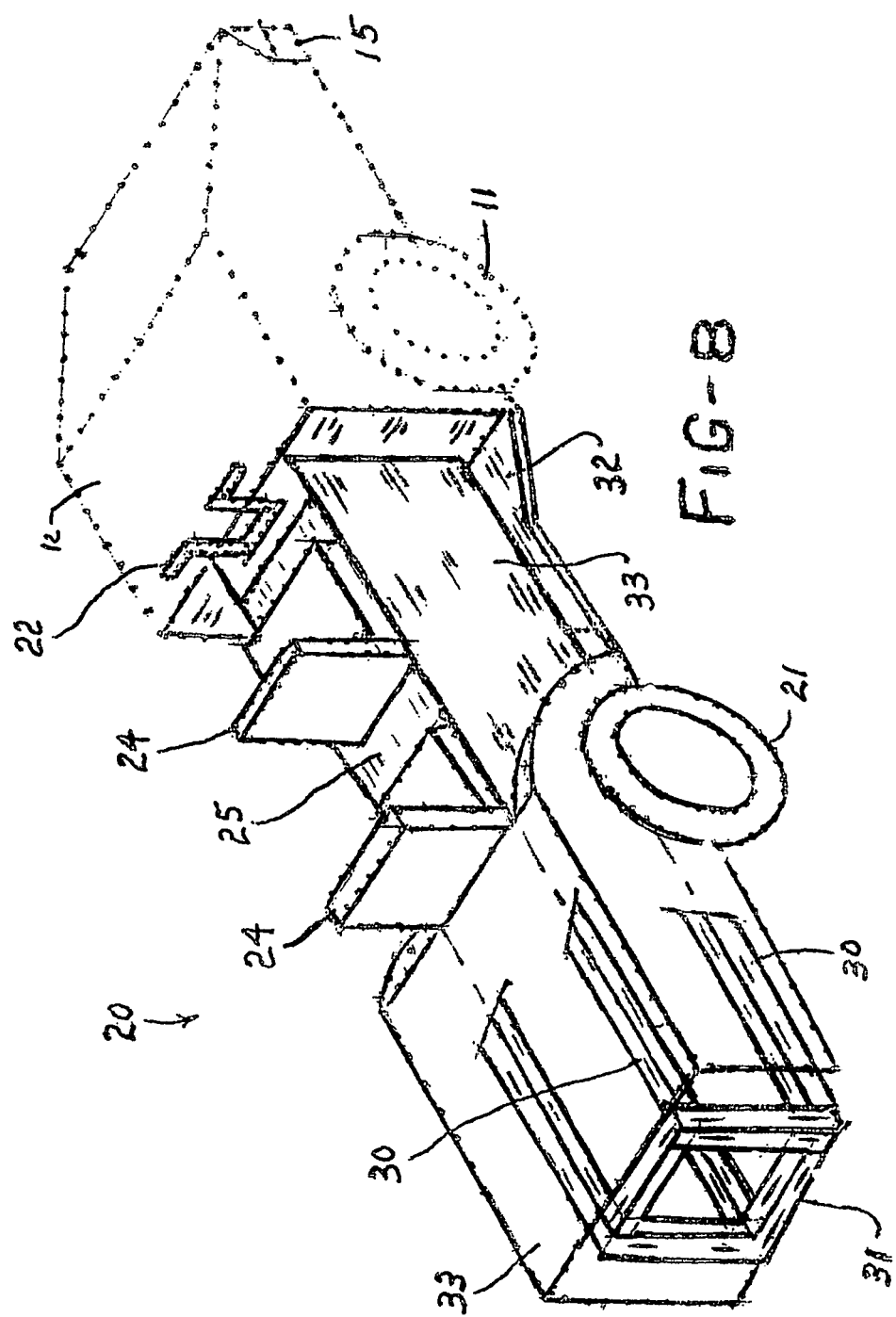

FIG. 8. A rear perspective view of the vehicle rear frame suspension module attached to an existing vehicle front frame suspension module.

Figure 9:
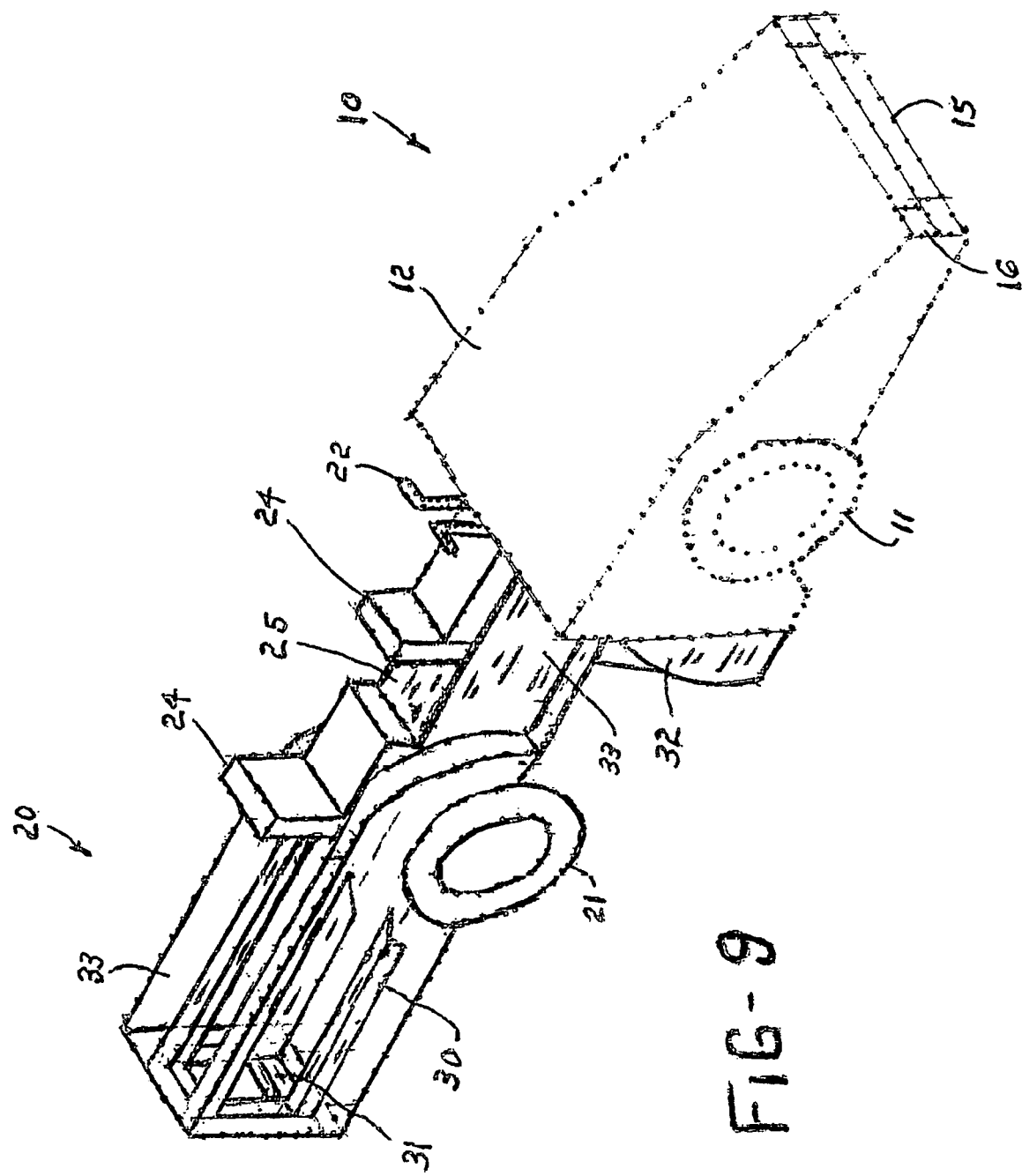

FIG. 9. A front perspective view of an existing vehicle front frame suspension module attached to the vehicle rear frame suspension module.

Figure 10:
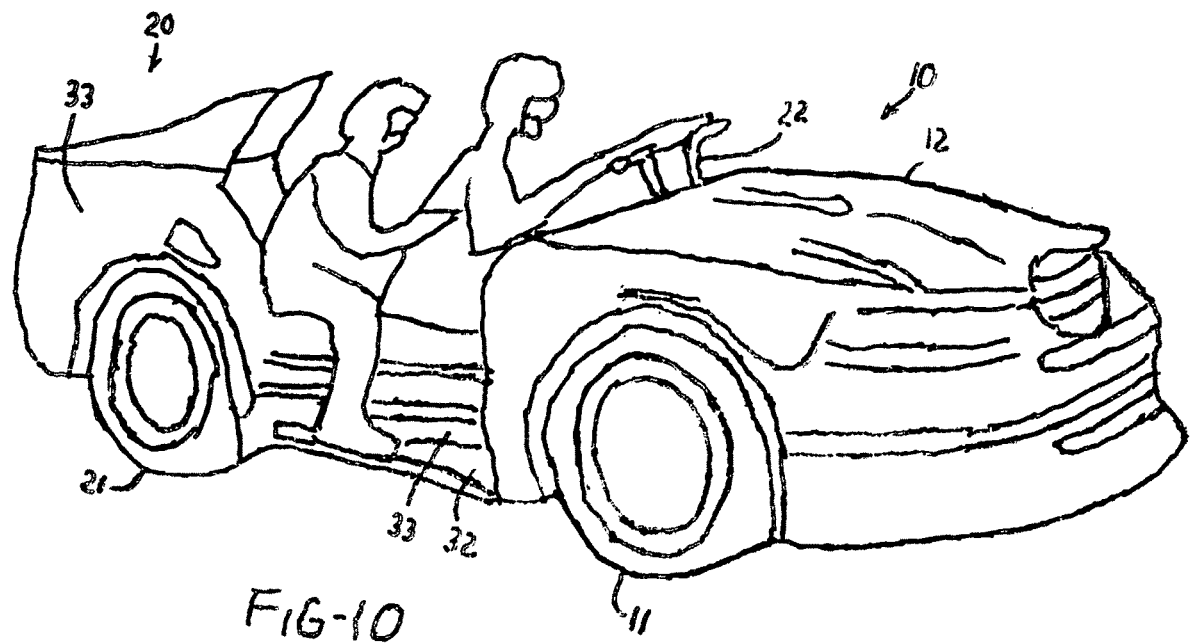

FIG. 10. A front perspective view of a different embodiment of the vehicle rear frame suspension module attached to an existing vehicle front frame suspension module.

Figure 11:
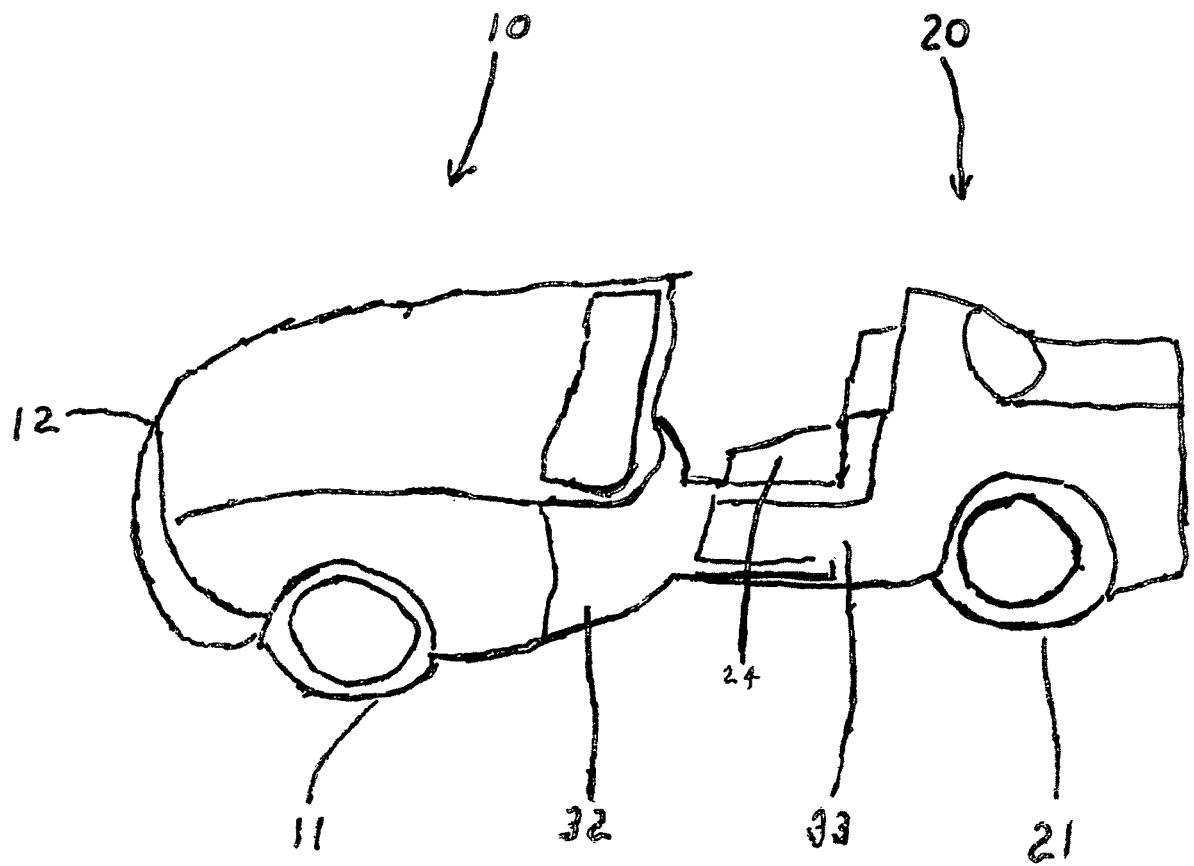

FIG. 11. A side perspective view of a different embodiment of the vehicle rear frame suspension module attached to an existing vehicle front frame suspension module.

Figure 12:
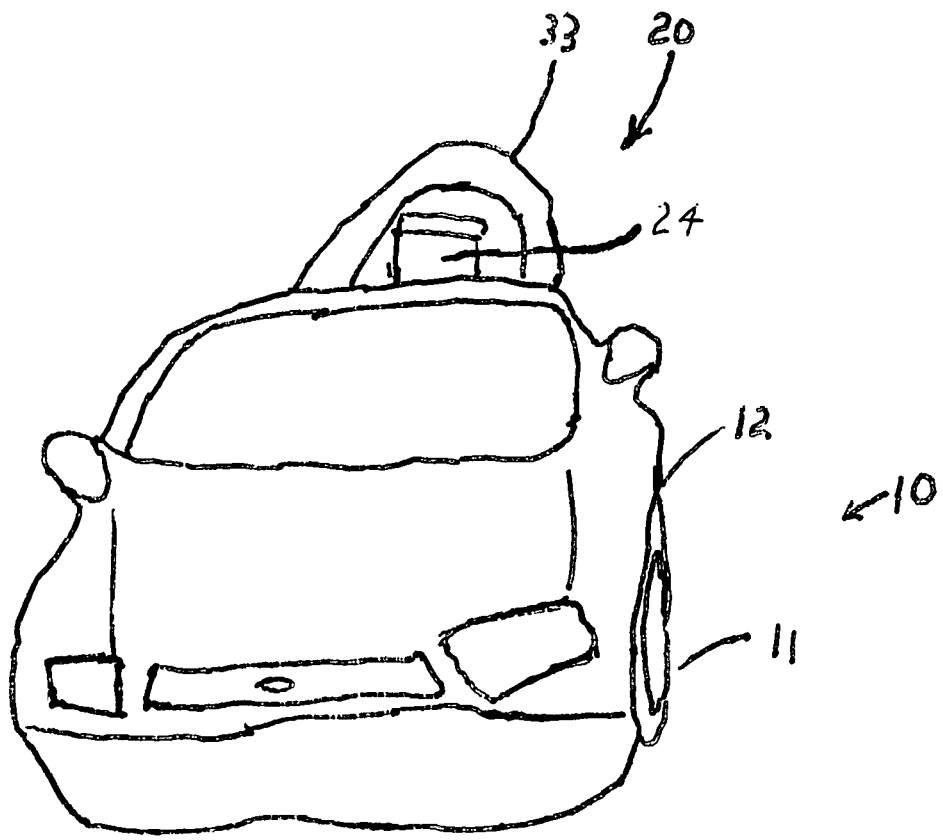

FIG. 12. A front elevation view of the embodiment of FIG. 11.

Figure 13:
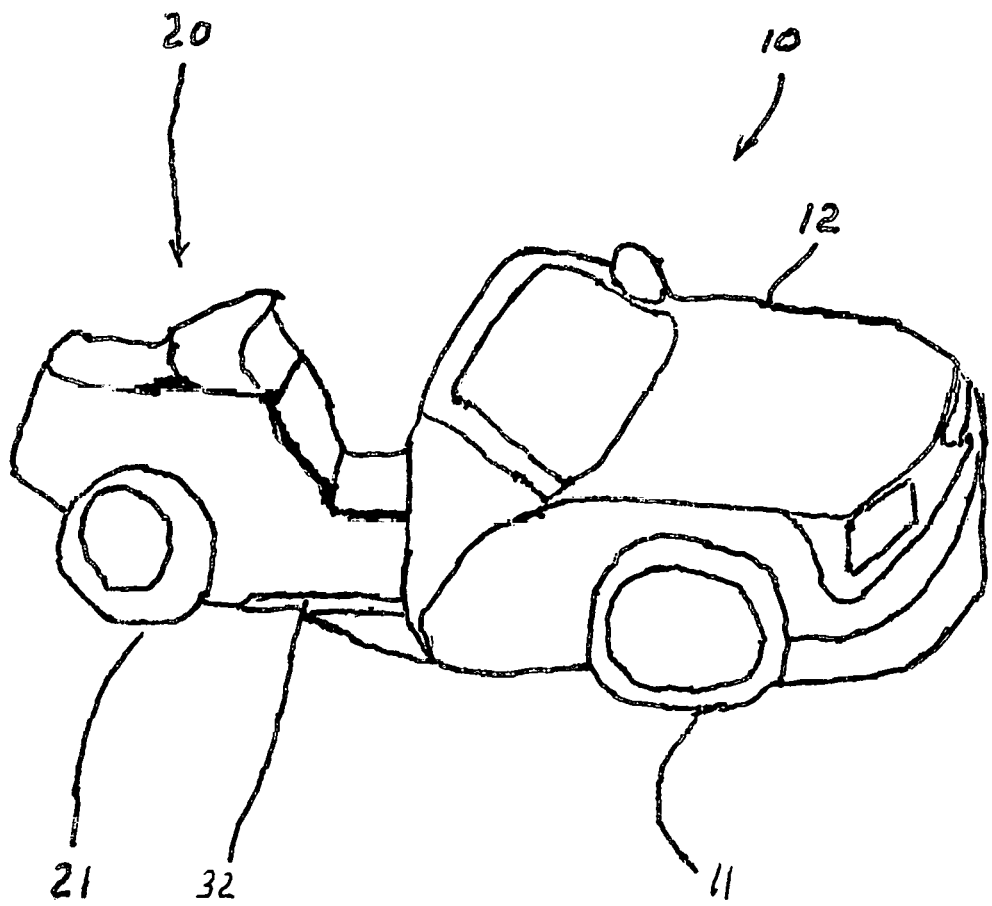

FIG. 13. A side perspective view of the embodiment of FIG. 11.

Figure 14:
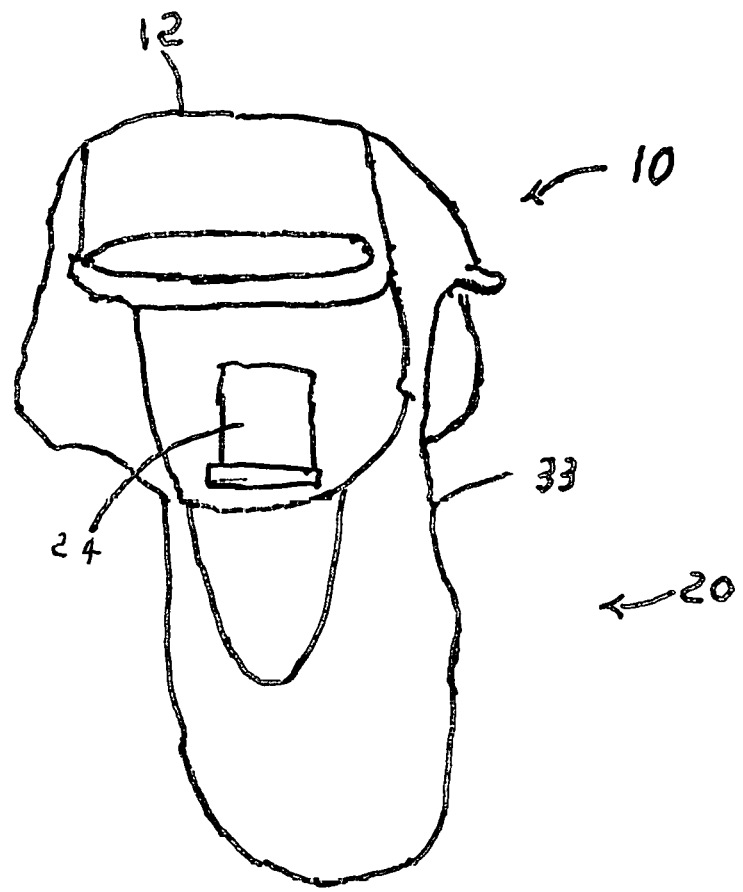

FIG. 14. A rear view of the embodiment of FIG. 11.

Figure 15:
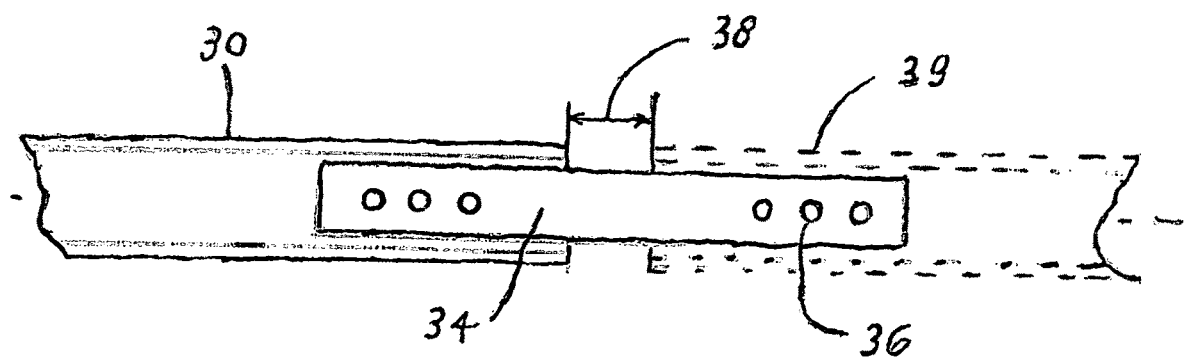

FIG. 15. A side view showing the vehicle rear frame rail suspension module attached to the front frame rail suspension module using the connection plate.

Figure 16:
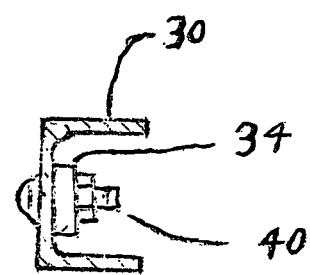

FIG. 16. A sectional view showing how the adjustment plate is fastened to the rear frame rail suspension module.

Figure 17:
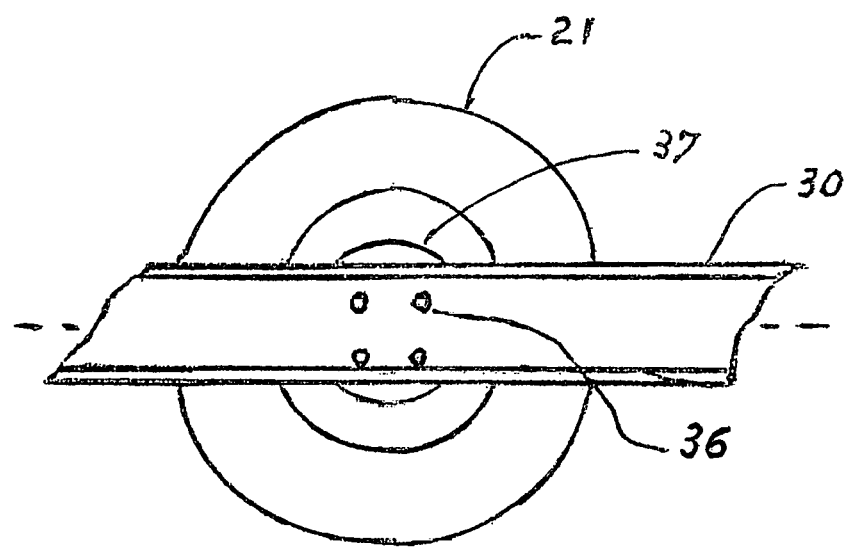

FIG. 17. A side view of the rear frame rail suspension showing how the wheel assembly is attached.

Figure 18:
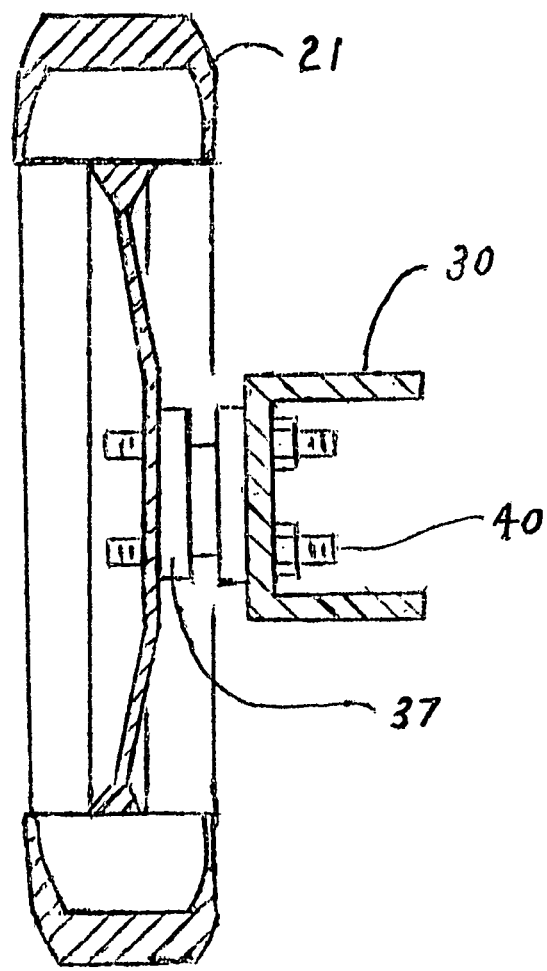

FIG. 18. A sectional view showing rear wheel assembly and rear frame rail connection.

Figure 19:
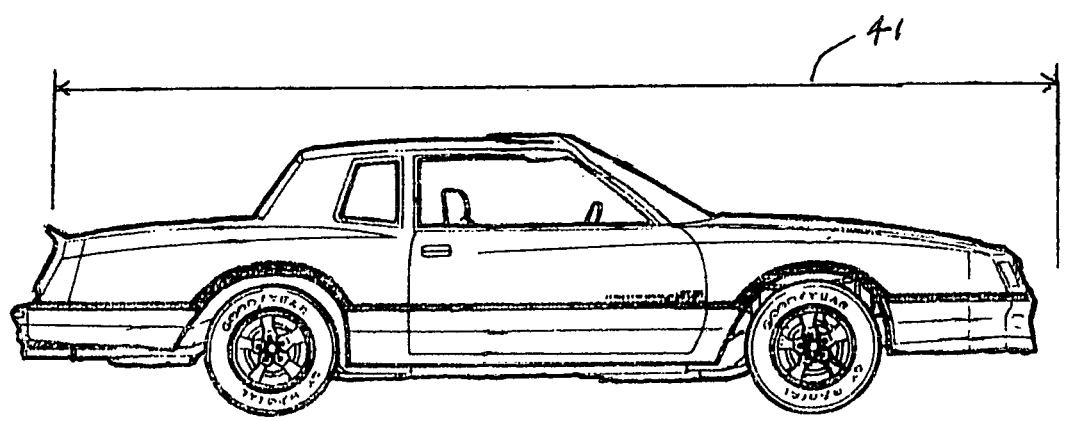

FIG. 19. A side view of an existing whole automobile.

Figure 20:
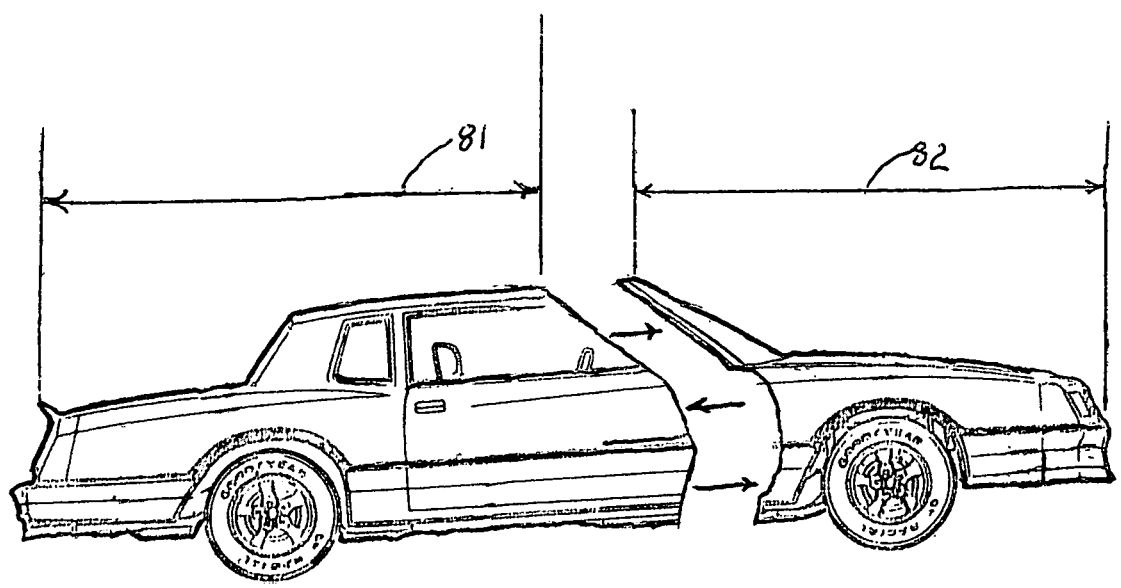

FIG. 20. A side view of an existing whole automobile with the rear module and front module being separated.

Figure 21:
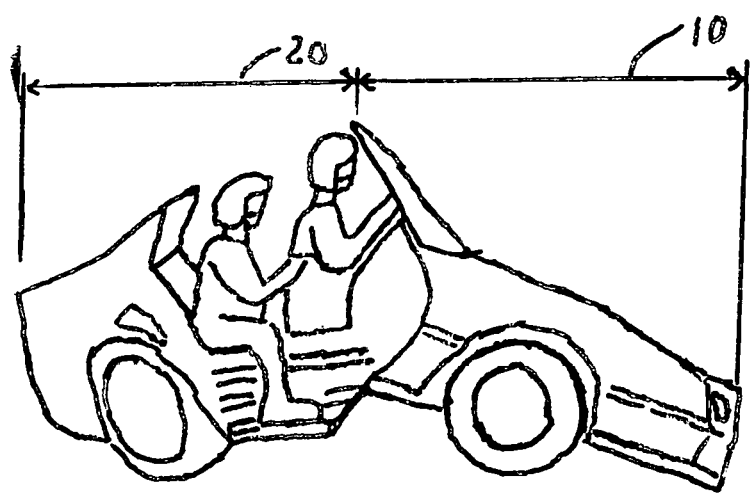

FIG. 21. A side view of the innovative rear frame suspension module attached to an existing front frame suspension module.

Figure 22:
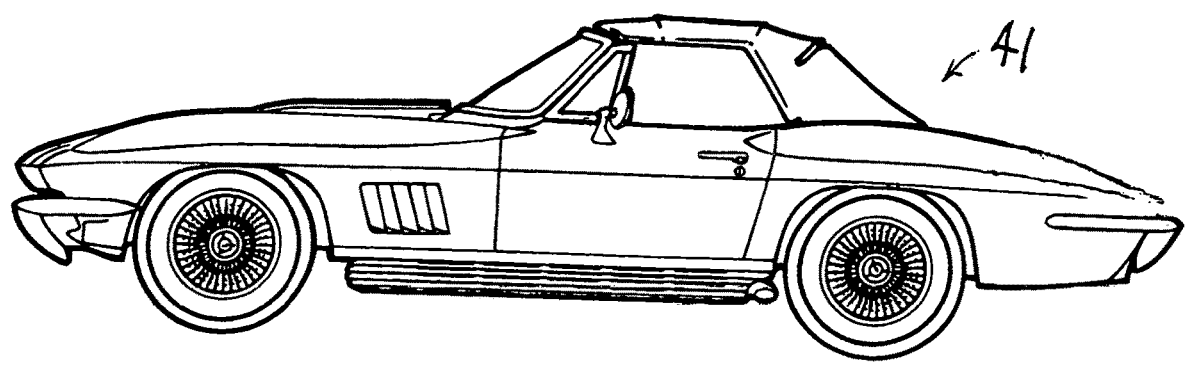

FIG. 22. A side view of an existing whole automobile.

Figure 23:
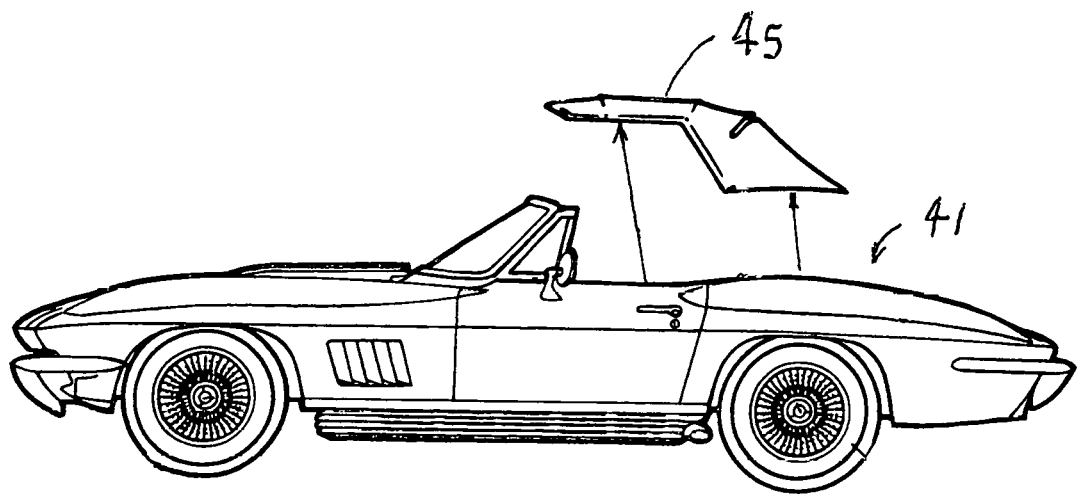

FIG. 23. A side view of an existing automobile with the top being removed.

Figure 24:
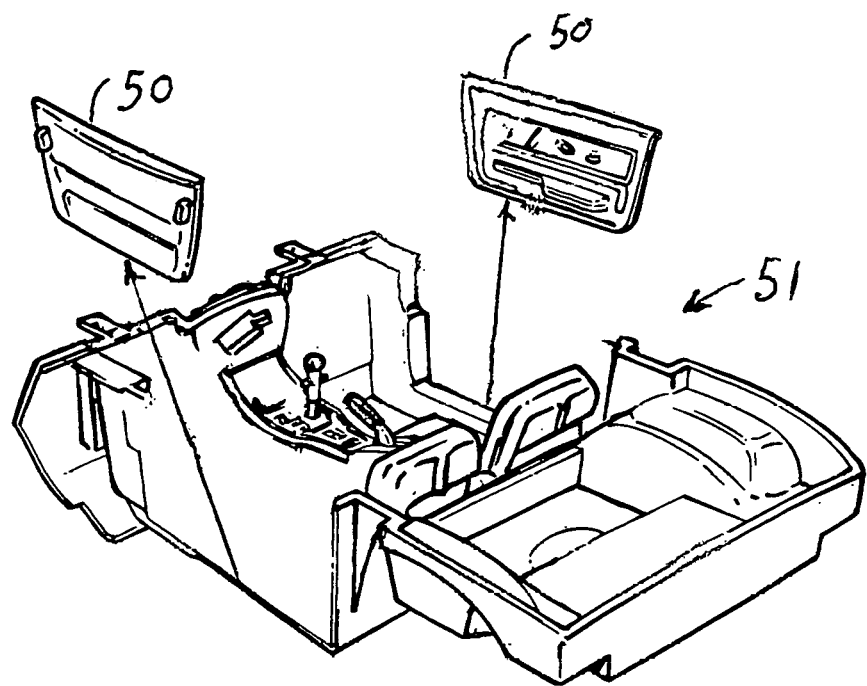

FIG. 24. A side view of an existing automobile passenger compartment with the doors being removed.

Figure 25:
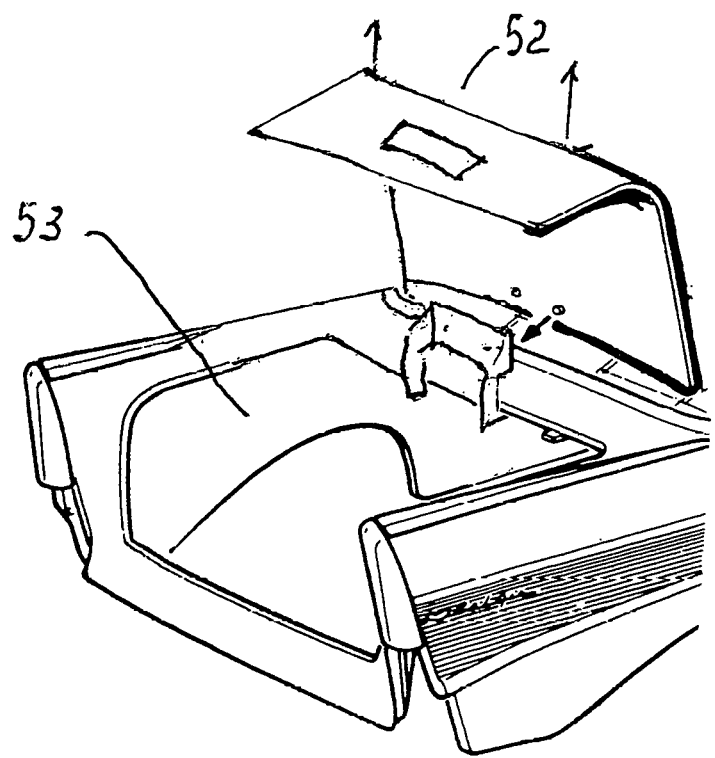

FIG. 25. A rear view of an existing automobile cargo space with the trunk door being removed.

Figure 26:
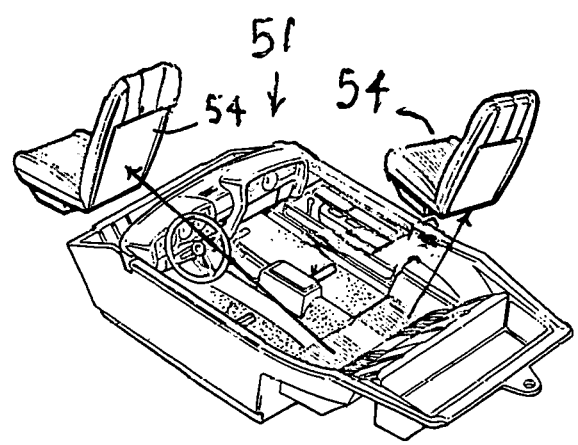

FIG. 26. A side view of an existing automobile passenger compartment with the seats being removed.

Figure 27:
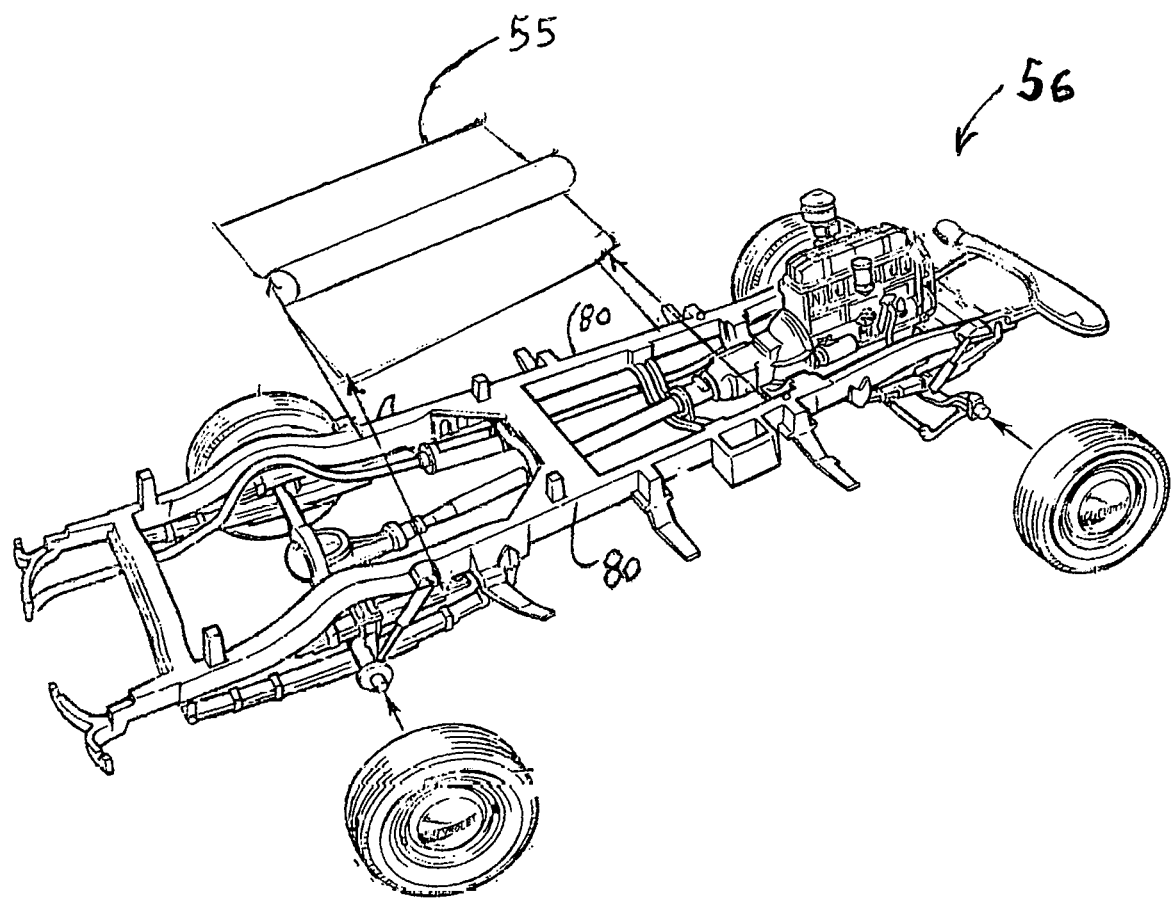

FIG. 27. A side view of an existing automobile frame structure with the floor board being removed.

Figure 28:
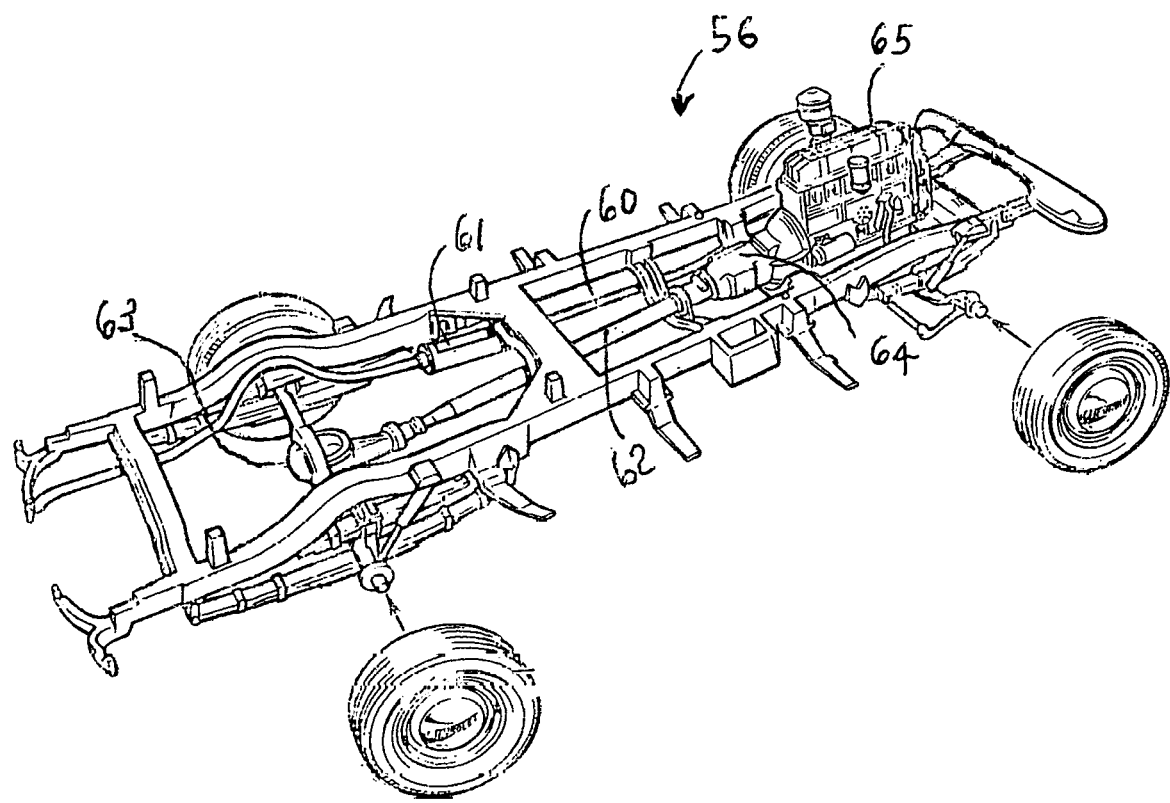

FIG. 28. A side view of an existing automobile frame structure with all of the components attached to it.

Figure 29:
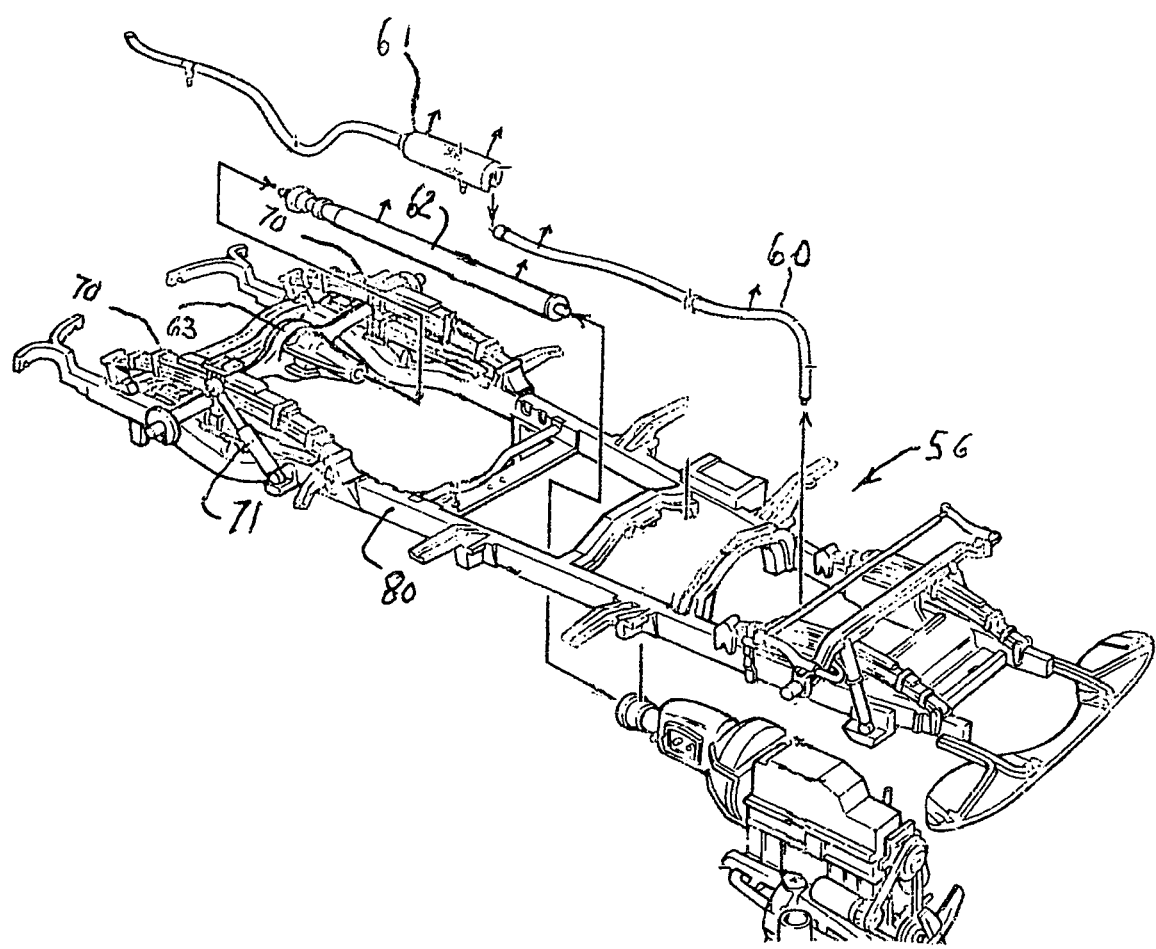

FIG. 29. A side view of an existing automobile frame structure with the tail pipe, muffler, and the torque tube being removed.

Figure 30:
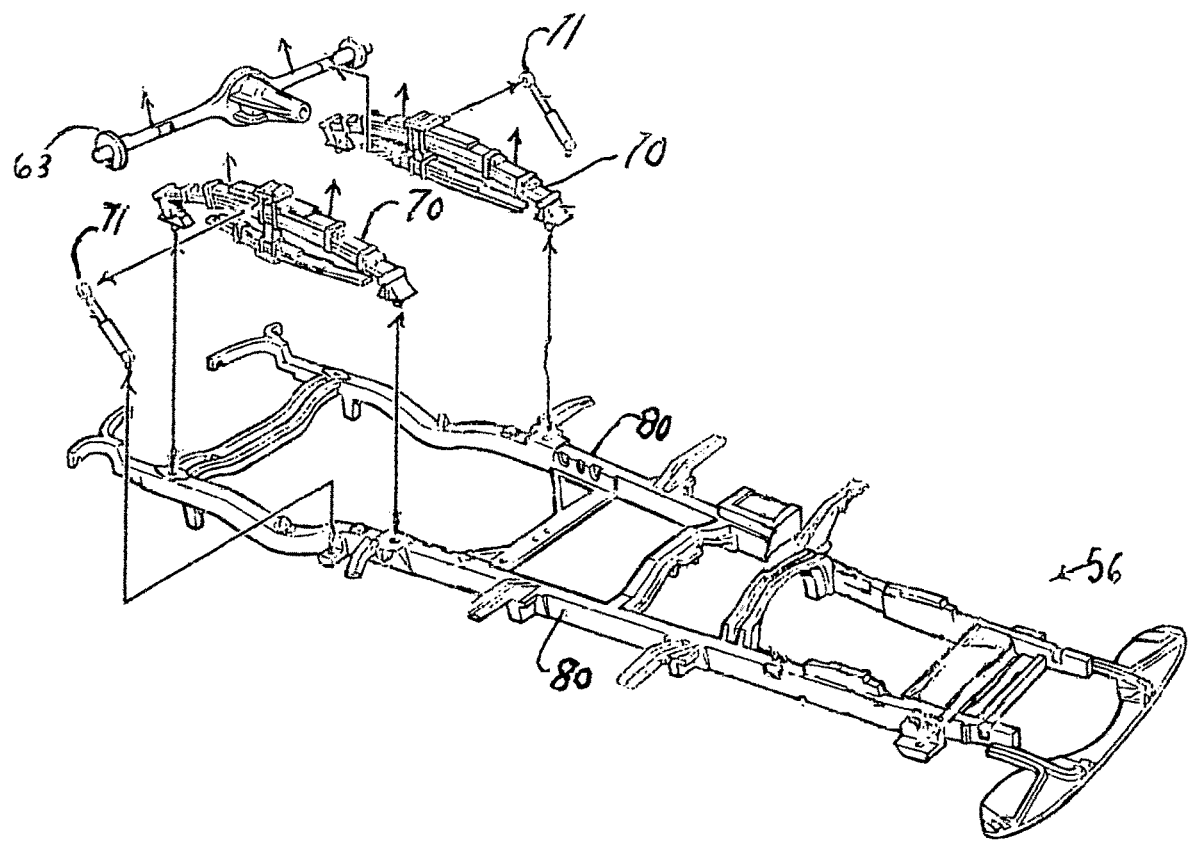

FIG. 30. A side view of an existing automobile frame structure with the rear axle differential, rear springs, and rear shocks being removed.

Figure 31:
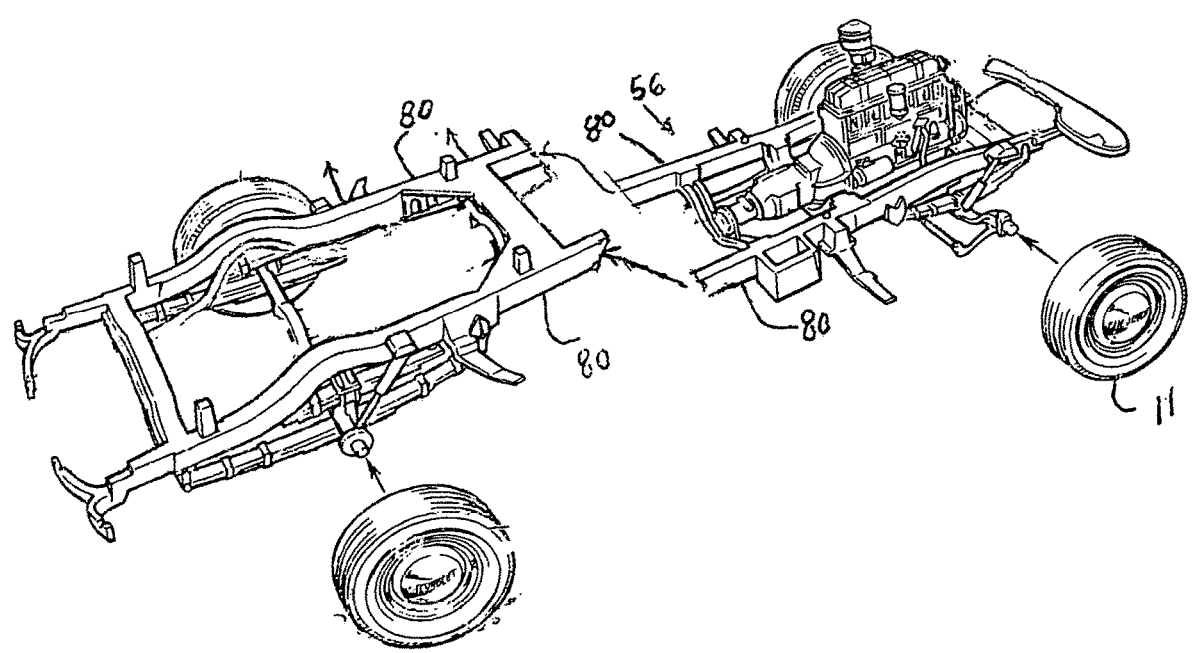

FIG. 31. A side view of an existing automobile rear and front frame suspension structures being separated.

Figure 32:
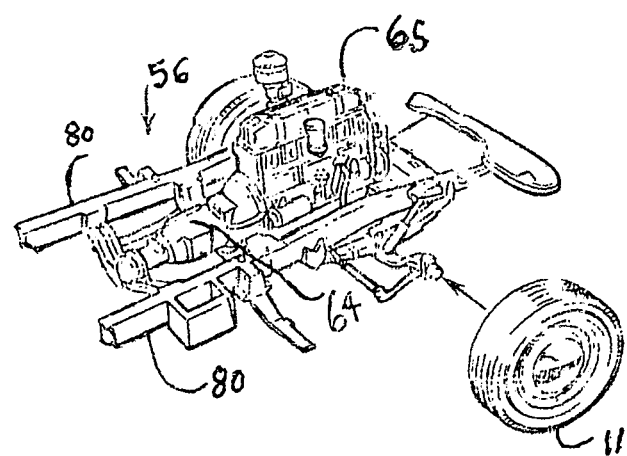

FIG. 32. A side view of an existing front frame module structure with the engine and transmission attached.

Figure 33:
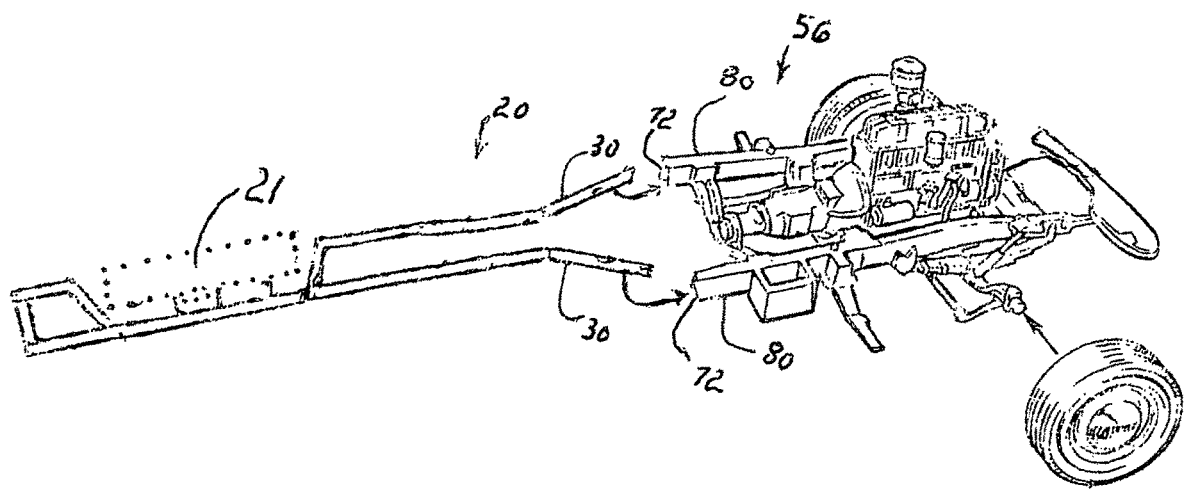

FIG. 33. A side view of the rear frame rail module being attached to the front frame rail of the existing vehicle.

Figure 34:
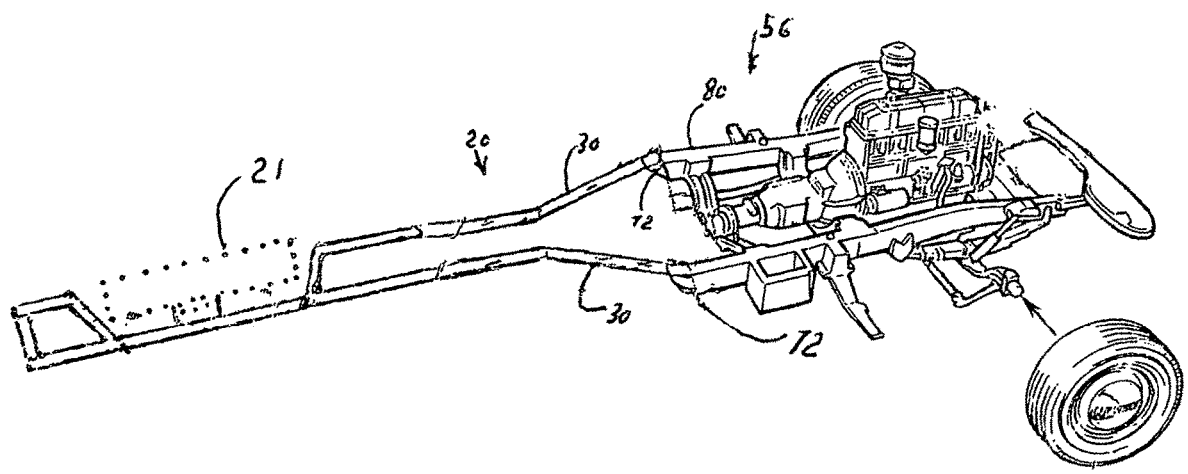

FIG. 34. A side view of the rear frame rail module being attached to an existing automobile front frame rail structure with welds or bolts.

Figure 35:
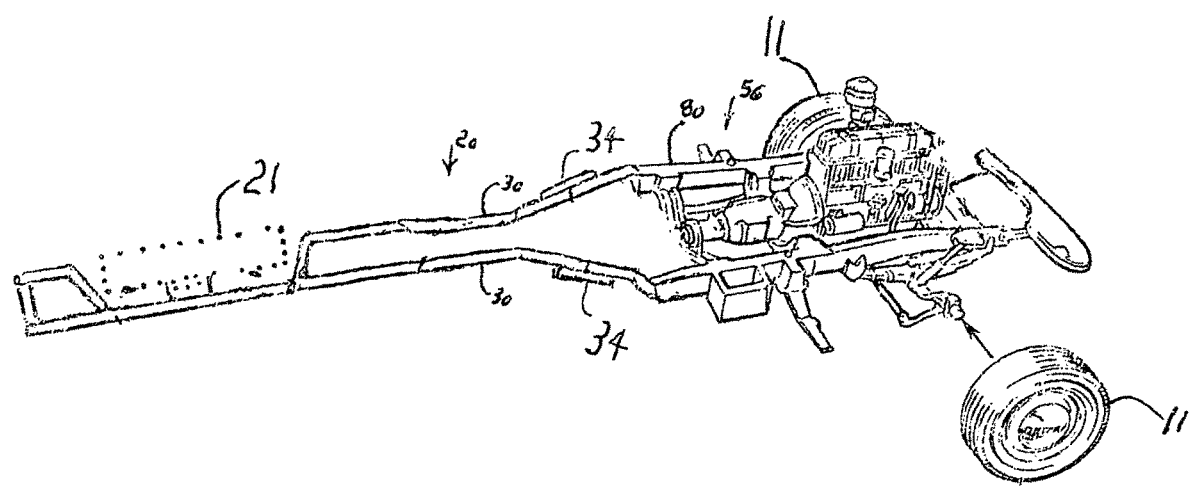

FIG. 35. A side view of the rear frame rail module at point of contact with an existing automobile frame rail with a connection plate added.

Figure 36:
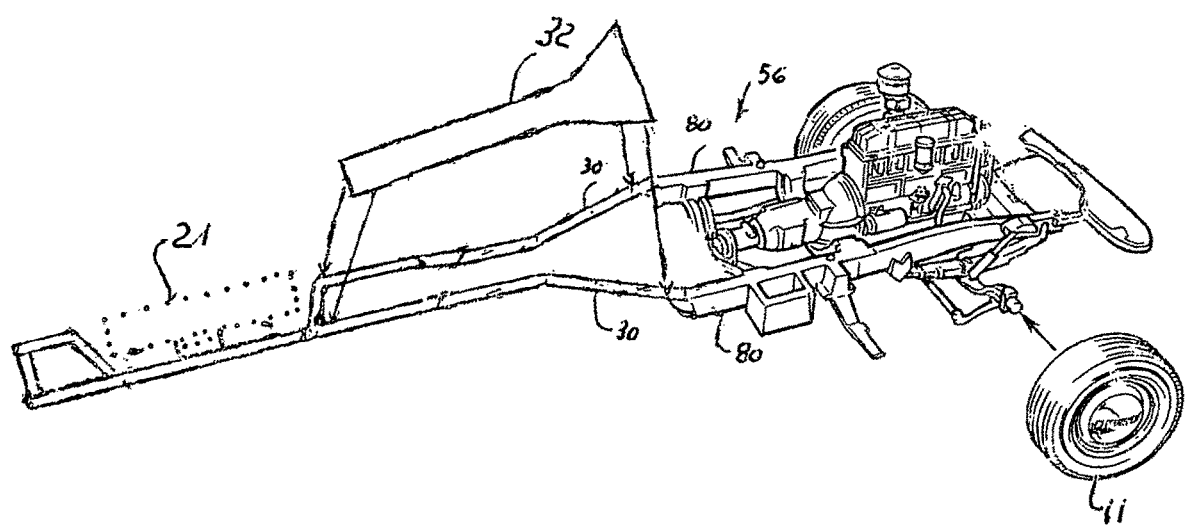

FIG. 36. A side view of the rear frame rail module with the floorboard being attached.

Figure 37:
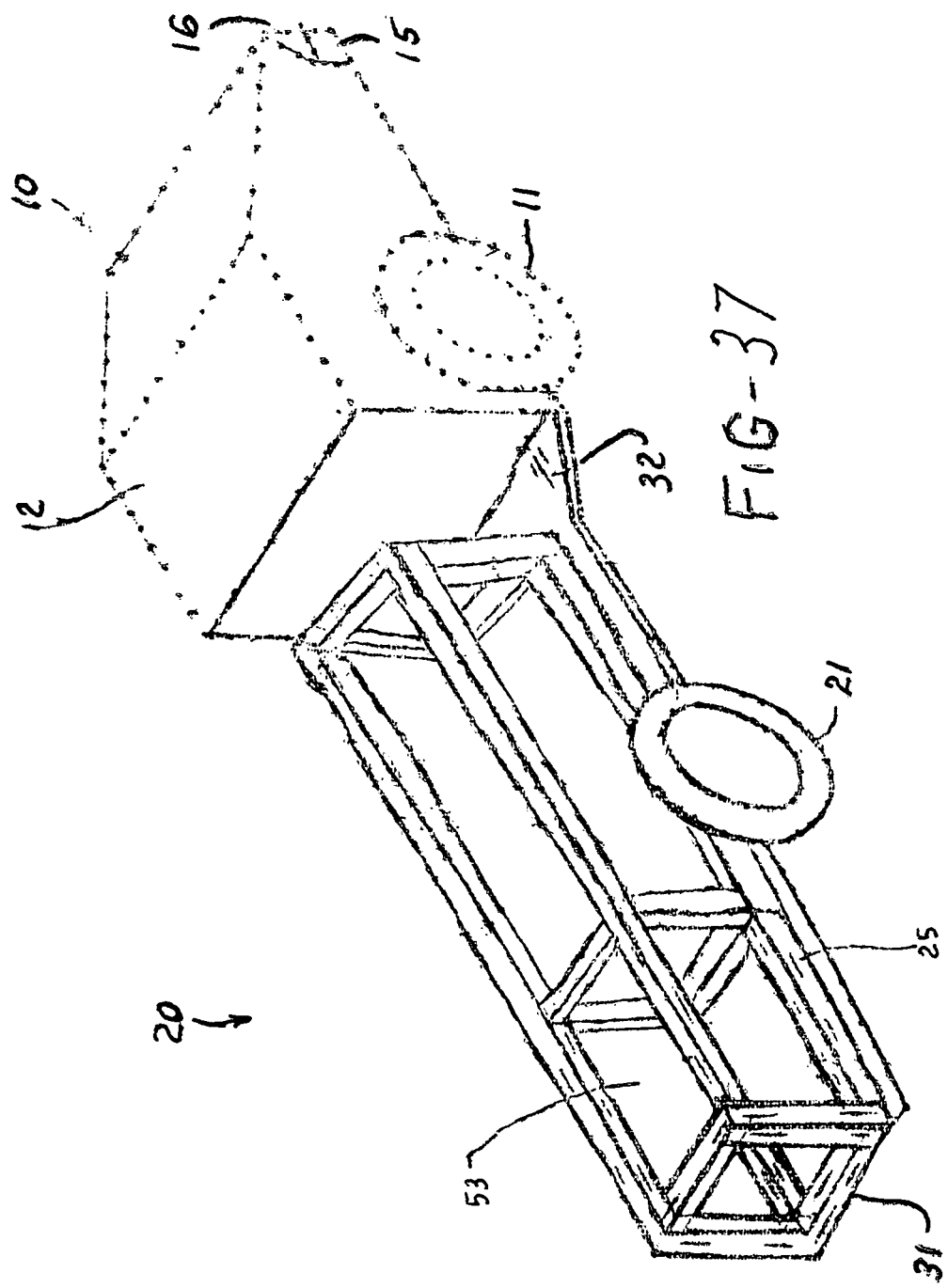

FIG. 37. A side view of the rear frame suspension module with the seat frame support being added.

Figure 38:
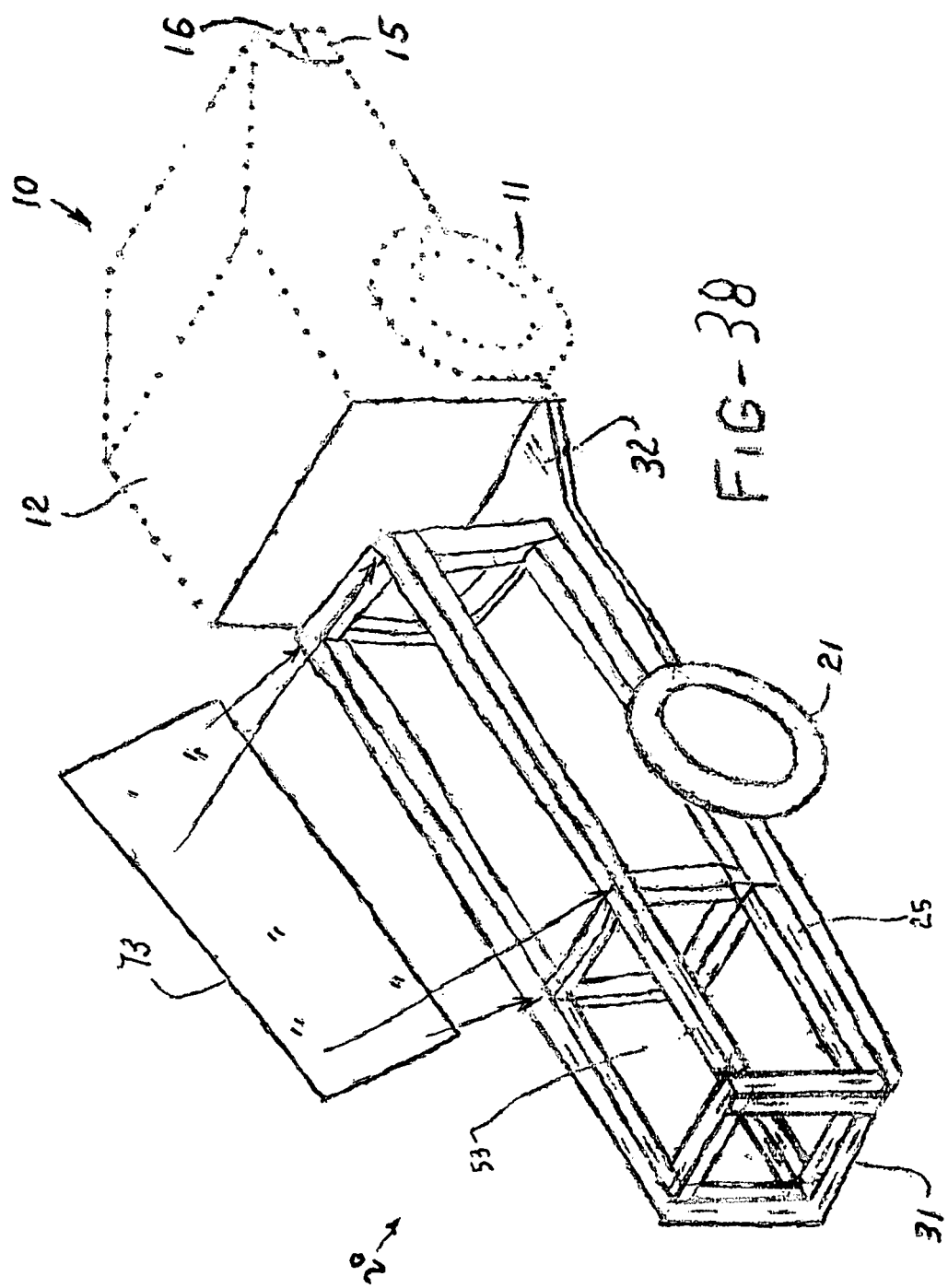

FIG. 38. A side view of the rear frame suspension module with the seat mounting plate being added.

Figure 39:
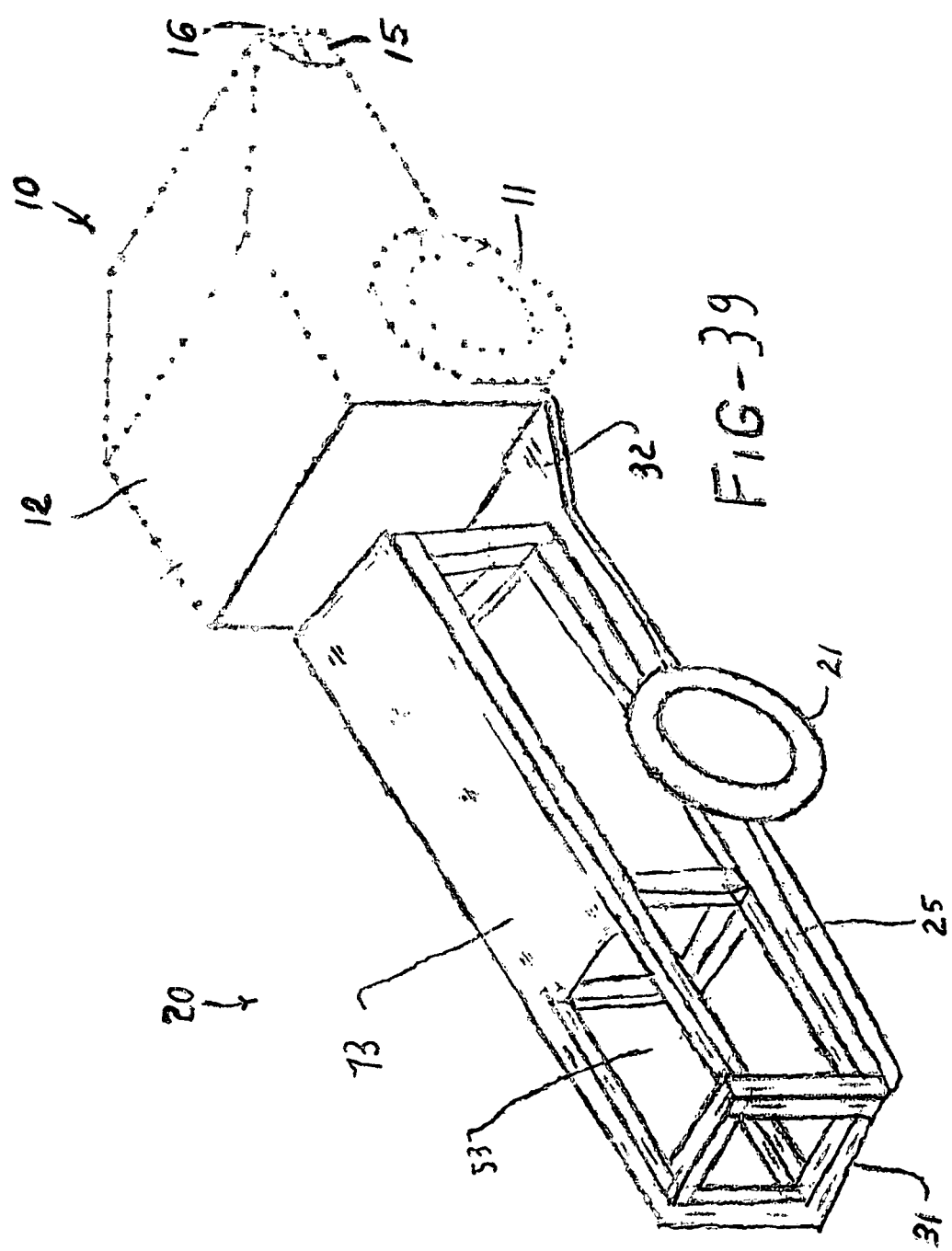

FIG. 39. A side view of the rear frame suspension module with seat plate being added and cargo space being shown.

Figure 40:
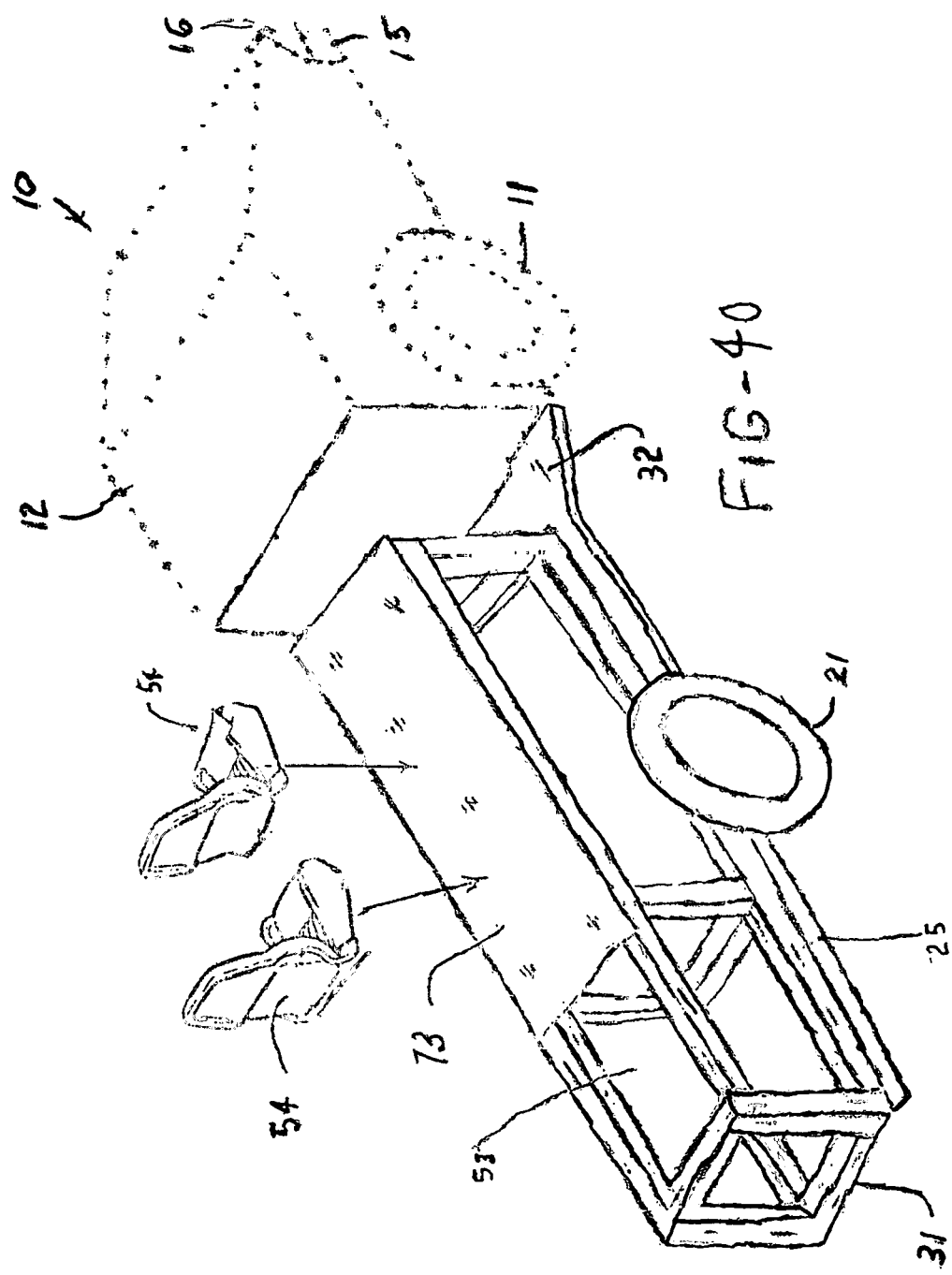

FIG. 40. A side view of the rear frame suspension module with the seats being added.

Figure 41:
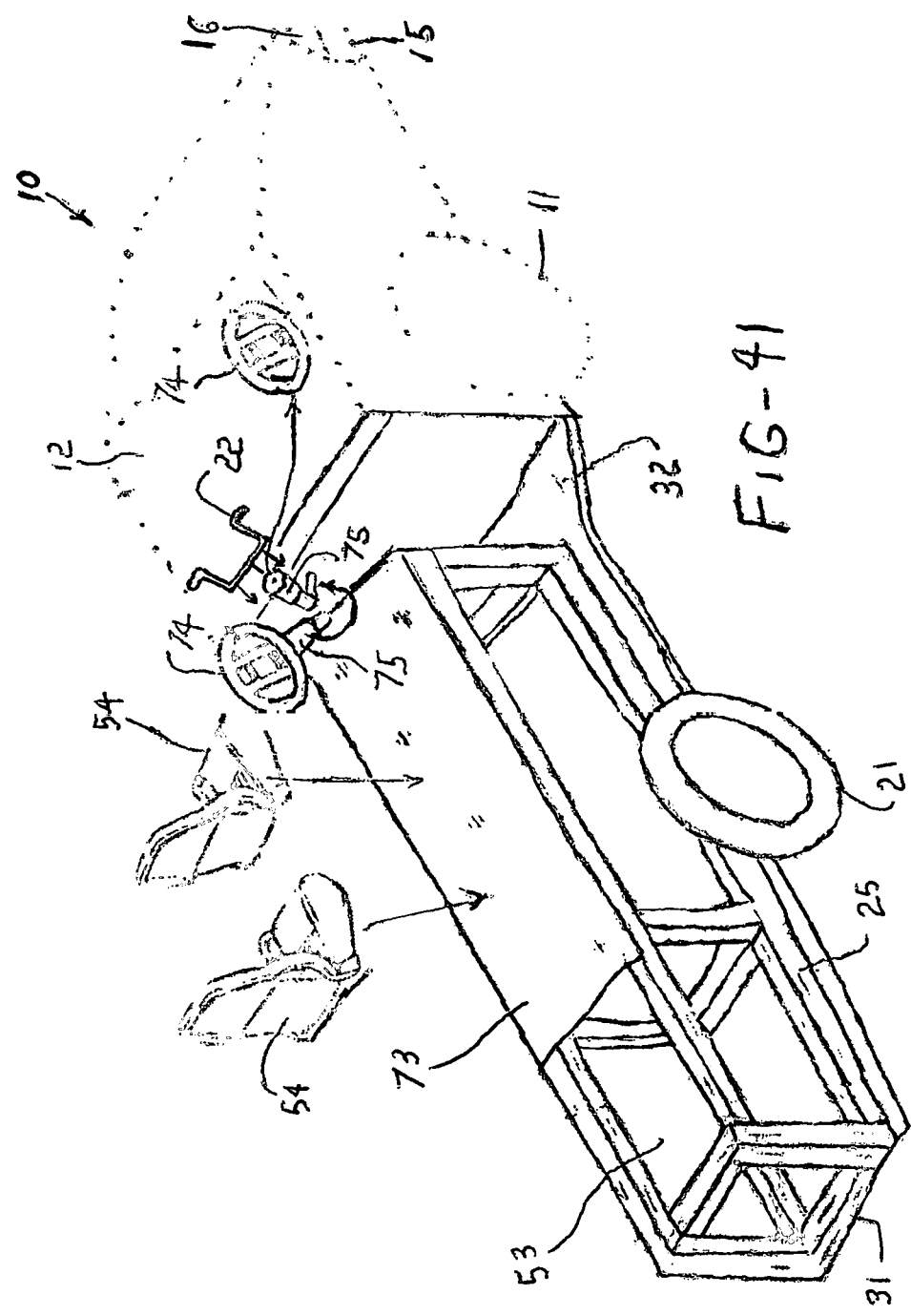

FIG. 41. A side view of the rear frame suspension module with an existing steering wheel. Column is being moved from the left side of the vehicle to the center of vehicle; the existing steering wheel is removed and replaced with a handle bar.

DETAILED DESCRIPTION OF THE INVENTION

The following detailed description should be read with reference to the drawings in which like elements in different drawings are numbered identically. The drawings, for illustrative purposes, which are not necessarily drawn to scale, depict selected embodiments and are not intended to limit the scope of the invention.

The method for conversion of an automobile having a front module, a first rear frame module, top, doors, seats, trunk, floor boards, wheel hub assemblies, steering wheel column, and frame rails starts with an existing automobile or truck. The existing vehicle rear frame suspension module (or passenger compartment) must be disconnected in steps and removed. This disassembling process creates space for the new, second rear frame suspension module. This rear frame suspension module can be attached or removed from various types of vehicles because they all have the same or similar frame rail shape. The invention frame rail connects to an existing front frame rail by installing a connection plate #34 (see FIG. 15) at connection point 72 (at cutoff point). The connection plate combines the rear frame rails to the existing front frame suspension rails (FIG. 15).

Once an existing vehicle is selected, a person of ordinary skill in the art of fabrication and transformation in an automobile manufactured setting, will start by disassembling the rear module structure of the existing vehicle and will follow the steps of the disassembling process to accomplish the scope:

Step 1. Remove the top 45 (FIG. 23) and disconnect and remove doors 50 and 51 (FIG. 24).

Step 2. Disconnect and remove trunk 52 (FIG. 25). Disconnect and remove seats 54 (FIG. 26).

Step 3. Disconnect and remove floor board 55 (FIG. 27). Disconnect and remove muffler 61 and tailpipe 60 (FIG. 29). Remove torque tube 62 (FIG. 29).

Step 4. Disconnect and remove rear springs 70, shocks 71, and axle differential 63 (FIG. 30).

Step 5. Existing rear frame module must be cut off approximately at the dashboard mounting area at connection point 72 and removed (FIGS. 31 and 33).

The process of disassembling and removing existing rear module will create space for the innovative rear frame suspension module, thus creating a combined motorcycle and automobile vehicle. Located in the existing front module structure are the engine and drive train use for propelling. The front module has a heating and cooling system, a steering system, an electrical system, and a braking system (FIG. 21). The process that using existing front module which contains existing mechanical components—the engine, drive train, heating and cooling system, steering system, electrical system, and braking system—will create a combined motorcycle and automobile vehicle.

FIG. 2 and FIG. 3 show the existing front frame suspension exterior body module 12, existing front headlights 16, existing front bumper 15, existing two front wheels 11.

The existing steering wheel column 75 on left side is then disconnected and column 75 is relocated to center of vehicle and reattached to the front module. The existing steering wheel 74 is then disconnected and replaced with a handlebar 22 which is attached on steering column 75.

FIG. 5 shows rear frame suspension module 20, rear wheel hub 18, and bearing assembly 37. The rear frame rails will be supported with the option of using one or two wheels (FIGS. 5-7). The existing wheel 21 connects to an existing wheel hub bearing assembly 37 and bolt 40. The assembly connects to the rear frame rails (FIGS. 4 and 17-18). One or two wheels are mounted on the rear frame suspension module 30 (FIGS. 5, 7, and 17) by using rear wheel hub and bearing assembly 37 with bolts and nuts 40 (FIG. 18). Floor boards are then formed by cutting a desired size to fit on top of frame rails 30 (FIG. 36). The cut boards are then mounted to the rear frame module.

To form the seat support structure, a box structure is created (FIG. 37) in the following manner:

1. Connecting a long base member on a right side.
2. Connecting two shorter base trusses 31
3. Connecting a long base member on a left side to the two shorter base trusses
4. Connecting six shorter vertical truss columns to all base members
5. Connecting long horizontal members on a top right side and left side
6. Connecting two top shorter members.

This forms a box type structure (FIG. 37). The seat plate 73 can then be formed by cutting desired size to fit on top of seat support structure (FIG. 39). The seat support structure and seat plate are then mounted along a central axis of the automobile. The completed seat support structure can have one, two, or more seats 24 and cargo spacing (FIG. 1-2). The support structure can have adjustable spacing which can be done in the passenger compartment by using the frame rail expansion space to increase or decrease the length of the frame rail 38 (FIG. 15).

One skilled in the art will connect innovative vehicle rear frame rail 30 (FIG. 16) approximately at the dashboard mounting area at connection point 72 (i.e. at the cutoff point of the front rails). The vehicle rear frame rails of the instant invention will connect to various types of existing vehicle front frame rails 39 because they have the same or similar rail shape 30 (FIGS. 16, 33, and 34).

Front frame rail 39 attached to rear frame rail 30 with nuts and bolts or welds (FIG. 16). The attachment is made by using a connection plate 34 (FIG. 15) that will connect the rear and the front frame rails together. The length of the plate increases or decreases 38 to accommodate the length of space in the passenger compartment for one, two or more passengers. The plate has an adjustable bolt holes 36. The plate is welded or bolted 40 to attach to frame rail (FIGS. 15-16).

The vehicle 10 is shown in FIG. 1 and FIG. 2. Existing front frame module 10 is attached to rear frame module with a narrow passenger compartment 20. The compartment can have one, two or more seats mounted on the seat frame support chassis 25, 22, 23. Existing rear mirrors 14 can be used for safe driving. Existing front windshield 13 can used to protect passengers from the wind. Passengers can place their feet on floorboard 32 (FIG. 4) while riding. The rear frame module has an exterior metal body 33 (FIG. 2). The frame rail 30 and the rear frame are the foundation. The rear frame suspension module can be supported by one wheel or two wheels 21.

Once the rear replacement module structure has been attached to the existing front module structure, the innovation is a vehicle that would be used to carry one, two, or more passengers from point A to point B.

What is claimed is:

1. A method for conversion of an automobile having a front module, a first rear frame module, top, doors, seats, trunk, floor boards, wheel hub assemblies, steering wheel column, and frame rails, the method comprising:
    a. disassembling the first rear frame module of the automobile from the front module comprising:
        removing said top;
        removing said doors;
        removing said seats;
        removing said trunk;
        removing said floor boards;
        removing said wheel hub assemblies;
        cutting off said frame rails at approximately a dashboard area to remove a rear portion of said frame rails to leave said front module of said automobile;
    b. attachment of a connection plate assembly to said frame rails of said front module;
    c. assembling a second rear frame module having a more narrow wheelbase than said first rear frame module, comprising:
        mounting a wheel hub bearing assembly to said second rear frame module;
        mounting a rear module floor board to said second rear frame module;
        mounting a seat support structure and a seat plate along a central axis of the automobile;
    d. connecting said second rear frame module to said frame rails of said front module via said connection plate assembly;
    e. disconnecting said steering wheel column and relocating said column to a center of said second rear frame module aligned with said seats; and
    f. connecting a handle bar to said steering column.

* * * * *